United States Patent
Ao et al.

(10) Patent No.: US 7,000,485 B2
(45) Date of Patent: *Feb. 21, 2006

(54) FLOW MEASUREMENT SYSTEM WITH REDUCED NOISE AND CROSSTALK

(75) Inventors: Xiaolei Ao, Lexington, MA (US); James E. Bradshaw, Tyngsboro, MA (US)

(73) Assignee: GE Infrastructure Sensing, Inc., Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/329,256

(22) Filed: Dec. 23, 2002

(65) Prior Publication Data

US 2003/0172743 A1    Sep. 18, 2003

Related U.S. Application Data

(63) Continuation of application No. 09/539,976, filed on Mar. 31, 2000, now Pat. No. 6,626,049.

(60) Provisional application No. 60/127,353, filed on Apr. 1, 1999.

(51) Int. Cl.
*G01F 1/66* (2006.01)

(52) U.S. Cl. .................................................. 73/861.29

(58) Field of Classification Search ............. 73/861.27, 73/861.28, 861.29, 861.18, 861.25, 861.26
See application file for complete search history.

(56) References Cited

U.S. PATENT DOCUMENTS

| | | | |
|---|---|---|---|
| 3,894,169 A | | 7/1975 | Miller |
| 4,003,252 A * | | 1/1977 | Dewath ................... 73/861.27 |
| 4,004,461 A | | 1/1977 | Lynnworth |
| 4,164,865 A * | | 8/1979 | Hall et al. ................ 73/861.28 |
| 4,174,255 A | | 11/1979 | Lawrie |
| 4,195,517 A | | 4/1980 | Kalinoski et al. |
| 4,320,659 A | | 3/1982 | Lynnworth et al. |
| 4,398,424 A | | 8/1983 | Abts |
| 4,417,480 A | | 11/1983 | Zacharias, Jr. |
| 4,454,767 A * | | 6/1984 | Shinkai et al. ........... 73/861.18 |
| 4,467,659 A * | | 8/1984 | Baumoel ................. 73/861.27 |
| 4,536,673 A | | 8/1985 | Forster |
| 4,598,593 A | | 7/1986 | Sheen et al. |
| 4,630,245 A * | | 12/1986 | Dam .......................... 367/93 |
| 4,914,959 A | | 4/1990 | Mylvaganam et al. |
| 4,959,228 A * | | 9/1990 | Skrgatic et al. ............... 426/11 |
| 5,000,478 A | | 3/1991 | Kerastas |
| 5,016,727 A | | 5/1991 | Wittrisch |
| 5,131,278 A * | | 7/1992 | Baumoel ................. 73/861.18 |
| 5,131,279 A * | | 7/1992 | Lang et al. .............. 73/861.27 |
| 5,178,902 A | | 1/1993 | Wong et al. |
| 5,179,862 A | | 1/1993 | Lynnworth |
| 5,275,060 A | | 1/1994 | Lynnworth |
| 5,307,830 A * | | 5/1994 | Welker ......................... 137/1 |
| 5,332,943 A | | 7/1994 | Bhardwaj |

(Continued)

FOREIGN PATENT DOCUMENTS

GB    2233253    1/1991

(Continued)

*Primary Examiner*—Max Noori
(74) *Attorney, Agent, or Firm*—Iandiorio & Teska

(57) ABSTRACT

A flow measurement system including at least first and second ultrasonic transducers coupled to an existing conduit, a damping material about the conduit between the first and second ultrasonic transducers to prevent crosstalk, a damping material about the conduit upstream of the first ultrasonic transducer to attenuate system background noise travelling in the conduit at large, and a damping material about the conduit downstream of the second ultrasonic transducer to attenuate system background noise travelling in the conduit at large.

41 Claims, 7 Drawing Sheets

U.S. PATENT DOCUMENTS

| | | |
|---|---|---|
| 5,343,109 A | 8/1994 | Mockl |
| 5,343,737 A | 9/1994 | Baumoel |
| 5,353,873 A * | 10/1994 | Cooke, Jr. .................. 166/64 |
| 5,437,194 A | 8/1995 | Lynnworth |
| 5,452,264 A | 9/1995 | Holroyd |
| 5,456,114 A | 10/1995 | Liu et al. |
| 5,473,934 A | 12/1995 | Cobb |
| 5,664,456 A | 9/1997 | Eckert |
| 5,714,687 A | 2/1998 | Dunegan |
| 6,026,693 A | 2/2000 | Baumoel et al. |
| 6,047,602 A | 4/2000 | Lynnworth |
| 6,065,350 A | 5/2000 | Hill et al. |
| 6,202,702 B1 | 3/2001 | Ohira et al. |
| 6,293,156 B1 | 9/2001 | Shen et al. |
| 6,382,033 B1 | 5/2002 | van Bckkum et al. |
| 6,490,933 B1 * | 12/2002 | Pan et al. ................ 73/861.27 |
| 6,626,049 B1 | 9/2003 | Ao |
| 2004/0123666 A1 | 7/2004 | Ao et al. |

FOREIGN PATENT DOCUMENTS

| | | |
|---|---|---|
| JP | 05018944 A | 1/1993 |
| JP | 11-352117 | 12/1999 |
| WO | WO98 19296 | 7/1998 |

\* cited by examiner

FLOW MEASUREMENT SYSTEM WITH REDUCED NOISE AND CROSSTALK

RELATED APPLICATIONS

This application is a continuation of U.S. patent application Ser. No. 09/539,976 filed Mar. 31, 2000 now U.S. Pat. No. 6,626,049 entitled "CLAMP-ON FLOW METER SYSTEM", which claims the benefit of U.S. Provisional Patent Application Ser. No. 60/127,353 filed Apr. 1, 1999, and this continuation application hereby claims priority to and hereby incorporates herein by reference U.S. patent application Ser. No. 09/539,976 and U.S. patent application Ser. No. 60/127,353.

FIELD OF THE INVENTION

The present invention is related to flow measurement, and in particular to ultrasonic flow measurement wherein a fluid flowing in a conduit is measured by transmitting ultrasonic waves into or across the flowing stream. Such measurement systems are widely used in process control and other situations where fluid measurement is required. In general the constraints involved in setting up any such system involve generating a well defined ultrasonic signal, coupling it into the fluid, receiving some portion of the signal after it has traveled through the fluid, and processing the detected signal to determine a parameter of interest such as flow rate, fluid density or the like. Measurement by ultrasonic signal interrogation offers several advantages, among which are the possibility of performing the measurement without installing specialized measurement cells, or even without intruding into the fluid or its container, and without causing a pressure drop or flow disturbance in the fluid line. When the situation permits the use of a transducer clamped to the outside so that no special machining is needed, then the further advantages of installation without interruption of flow, low maintenance cost and portability of the measurement system may be obtained.

However, there are many trade-offs in configuring an ultrasonic fluid measurement system. Genreally, the conduit or vessel wall carries noise and may also constitute a significant short circuit signal path between transducers. Further, when the fluid has very low density, or is a gas, it carries very little signal energy compared to that in the pipe wall, and acoustic impedance mismatch may couple the signal poorly, resulting in passage of an extremely weak signal.

When the fluid to be measured is of low density, such as steam at low pressure, lower molecular weight hydrocarbon liquids, or flare gas at atmospheric pressure, the foregoing factors all apply, and the low acoustic signal across the fluid together with the high level of conduit and short circuit noise have heretofore frustrated the design of an ultrasonic flow measurement system for clamp-on application to steel pipe. While wetted transducers adjacent to the free stream may be implemented with special installation or custom spool pieces, it would appear that substantial improvements in attainable signal quality will be required before an effective external measurement system can be devised for these fluids, for flowing steam at low pressures, or for flare gas at atmospheric pressure.

It would therefore be desirable to develop an external ultrasonic system for measuring the flow of low density liquids and fluids such as steam or gas in a conduit.

It would further be desirable to develop an ultrasonic system which conveniently clamps onto a flow conduit without machining operations or interruption of the flow, and which is capable of launching and receiving signals effective to determine flow measurement.

SUMMARY OF THE INVENTION

The present invention achieves one or more of the foregoing objects by providing first and second clamp-on ultrasonic signal transducers externally coupled or attached to a steam or gas conduit, and positioned to launch and receive contrapropagation signals along a path across the flowing fluid. The transducers apply polarized shear wave to the conduit wall to couple energy to or from a region of the wall transmitting a strong signal into the fluid. Further, the transducers are precisely aligned with the axis along the mid plane of the conduit and when acting as a receiver each transducer has an enhanced sensitivity to coherent energy transmitted through the fluid, effectively re-polarizing energy received along the transit path. The transducers are selected to produce a well defined signal of relatively high power, and preferably in a single mode with a short pulse. The transmitted signal travels along a coupling wedge to provide a polarized shear wave that refracts into the conduit wall. The wedge is preferably a low sound speed (e.g., a polymer) wedge that couples a shear wave beam into the pipe wall at a high angle of incidence so that the vertically polarized beam produces multiple internal reflections within the wall, coherently energizing a region of the wall and radiating the transmitted signal into the fluid as a beam directed across the flow. The vertical shear (SV) configuration of the transmitter and receiver effectively discriminates to receive acoustic energy with polarization on the mid plane of the conduit. Thus, the signal crossing through the fluid maintains its polarization plane, i.e. is repolarized to the same waveform, after two mode conversions through shear-longitudinal-shear along its path from pipe to fluid to pipe. The polarization plane of a transverse wave traveling laterally around the pipe wall rotates after zigzagging inside of the curving pipe wall, and is subject to other interfering or canceling effects, so the SV assembly effectively filters out a substantial amount of the crosstalk present as horizontally polarized shear wave energy propagating along the pipe wall from the opposite transducer. This results in a substantially higher signal to noise ratio than expected, even prior to further (electrical) signal processing.

The transducer assembly may employ a damped crystal of dimensions effective to provide an output that converts to the desired waves in the pipe wall, i.e., to a vertically polarized shear wave signal, typically at a frequency between about 50 kHz and 1 MHz, depending on the acoustic properties of the fluid and the thickness of the pipe wall. To further reduce short circuit energy inside the pipe wall, including types of plate wave and Rayleigh wave, particularly Rayleigh wave that travels effectively along the curved surface, a couplant such as a gel or gel type of high temperature damping material (polymer) is applied between the conduit and a damper (or just the couplant alone may be applied to the conduit) to couple this part of the energy from the pipe and further minimize the noise effectively. The shear wavelength in the pipe wall is advantageously less than the skip distance in the wall when the system relies on coherent reinforcement to energize a region of the wall, as described further below, to launch a strengthened signal in the fluid.

The transmitter and receiver are preferably identical assemblies, and act, together with their mounting, as polarizers so that as transmitters they effectively enhance the signal of interest and, as receivers, reject other components of the pulse burst. The transducers employ a single mode crystal or preferably a high sensitivity broad band transducer such as one formed as an array of cells constructed of a composite electroactive material, to produce, in the simplest case, a clean longitudinal pulse of relatively homogeneous power distribution across its face, and this is coupled by the wedge into an axially extending region of the conduit wall to launch the fluid-borne signal. At the receiving transducer the signal is received through a similar wedge arrangement, and the transducer output preferably also passes through a band-pass filter with center frequency at the transmission frequency.

The transducers may be coupled to the conduit via a plastic wedge to launch a mode-converted shear wave signal into the wall as a skip or zigzag signal reflecting at a steep angle, or may couple via a stainless steel wedge of appropriate geometry to determine its launch angle into the conduit. The launch angle is set so that the shear wave reflects internally in the conduit to energize a region of the pipe wall for some distance along the direction of flow, and the wedge is aligned so that the signal reflecting within the wall is coupled into the flowing fluid coherently over a region extending along its axis as the wall-borne shear wave signal reflects internally in the conduit wall. The enhanced transmission geometry allows enhanced coupling into the low density fluid, and the receiver may be positioned for signal reception at a position that is as much as one or even several pipe diameters along the flow steam to enhance resolution.

The transducer/wedge assembly is typically coupled to the conduit by a hold-down clamp, such as solid block or plate with a bottom face curved to seat on the conduit and cinched down with a strap or chain. The transducer/wedge fits in a channel of the plate, and is urged against the conduit wall by one or more set screws, locking cams or the like. In accordance with another aspect of the invention, this mounting plate is positioned over a sheet layer of material which is both acoustically damping and thermally insulating, so that it resides at a temperature closer to ambient than that of conduit wall. The mounting plate urges the transducer into acoustic contact with the conduit wall through a window in the damping/insulating sheet or layer, while itself thermally contacting the transducer assembly and acting as a thermal sink for the transducer or wedge.

BRIEF DESCRIPTION OF THE DRAWINGS

These and other features of the invention will be understood from the description below taken in connection with the figures illustrating representative embodiments thereof, wherein.

DETAILED DESCRIPTION OF THE INVENTION

Figure 1:
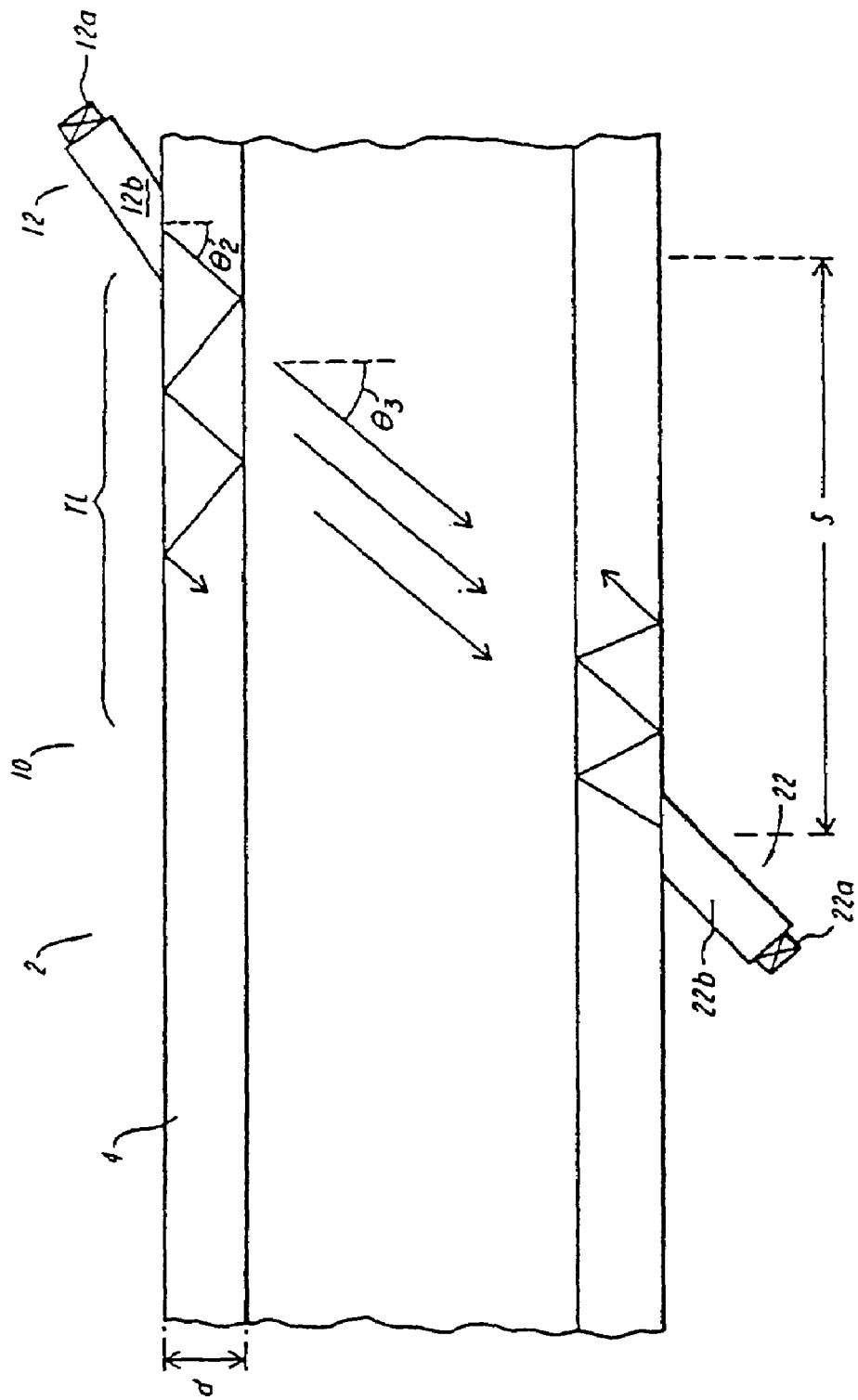
FIG. 1 is illustrates a first embodiment of the invention.

FIG. 1 shows an exemplary embodiment of a measurement system 10 in accordance with the present invention for measuring the flow of a low density liquid, low pressure steam or a gas such as flare gas in a conduit 2. This material will be referred to below simply as "steam" or "gas", but will be understood to refer to such fluids generally, and, as applied to steam or gas, to refer both to steam at pressures below about three or four atmospheres up to pressures of fifteen to fifty or more atmospheres, and to a gas which may be at low or ambient pressure such that it presents a substantial impedance mismatch to the stack or conduit in which it flows.

As shown, the conduit 2 has a wall 4 with a thickness "d" which may, for example, be on the order of one half centimeter to several centimeters or more. As noted above, a problem in measuring a flowing gas or fluid such as steam at low pressure or temperature is that the conduit itself may be quite noisy, and may ring for a long time, carrying random mechanical noise and transmitter-generated coherent noise ("crosstalk") to the receiving transducer(s). Further contributing to the difficulty of measurements, the gas or steam has a very low density and low sound speed so that very little signal can be coupled into and transmitted through it, or be detected above the level of background noise. The low sound speed may result in inconvenient refractive path angles, and signal acquisition may be possible, if at all, only for closely spaced small paths, possibly on small conduits, or using special measurement cells, or transducers extending into the free stream.

By way of overview, the present invention addresses these limitations by arranging system components to provide counterpropagating signal paths across the gas of enhanced signal level and low noise by, on one hand providing a polarization-enhanced transmission signal launched so that a region of the wall acts as a coherent transmitter into the gas and, on the other hand, repolarizing the received signal to effectively discriminate against spurious received noise.

As shown in FIG. 1, an emitting transducer 12 has a crystal 12a or other ultrasonic wave generator which preferably generates a clean signal that is carried by a coupling wedge 12b to refract as a shear wave at an angle into the conduit wall. The transmitted wave refracts to an angle $\theta_2$ and undergoes internal reflections which propagate along the wall with a skip distance $L_p$ between successive reflections at each surface. The angle $\theta_2$ is preferably relatively steep, e.g., about seventy degrees with respect to the normal, and the wedge angle enhances the conversion of the signal pulse to shear wave energy as it enters the wall and promotes internal reflection, such that the vertically polarized shear wave component created by mode conversion reflects internally and remains coherent for a some length TL along the conduit wall. That is, the internal reflections interfere constructively for several skip distances $L_p$ so that an extensive region of the wall operates as a transducing length to launch a compressional wave signal at a defined oblique angle across the fluid in the conduit. The active wall region or transducing length TL extends axially away from the mounting point toward the other transducer. Thus, a region of the wall 4 is energized to emit ultrasonic energy into the fluid flowing through the conduit. The portion transmitted into the fluid has a refracted path angle $\theta_3$ with respect to the normal. In air, $\theta_3$ is typically about 6°, and in steam, about 8°. On the other side of conduit 2, a similar receiving transducer 22 comprised of a signal-generating portion 22a and a wedge 22b, is clamped onto the outside of the conduit, spaced at a distance S along the flow direction, to receive energy which has traveled through the fluid and entered the opposing conduit wall. The distance S may be as much as one pipe diameter, although in some embodiments shorter offsets may be used. Decoupling of surface wave crosstalk is preferably also practiced, as discussed below, particularly when the conduit itself has a relatively high curvature, e.g., with a diameter under about six inches.

As illustrated by the oblique mounting of the crystals, each transducer assembly may include includes a mounting block, wedge, guided wave buffer rod or similar arrangement for coupling energy between the crystal and the pipe, and configured to either carry a shear wave signal or produce such a signal by mode conversion and couple it to the wall at a defined angle. As further shown schematically in FIG. 1, a Rayleigh wave attenuating or coupling material 25 is placed on the conduit between transmitter 12 and the receiver 22, to absorb Rayleigh wave energy propagating in the pipe wall and prevent its reception by the transducers. The transducer assembly 12 and the transducer assembly 22 each operate both as transmitter and as receiver. The attenuating material 25 may also absorb other modes e.g., Lamb or plate-type waves, that would otherwise degrade the signal to noise ratio.

In general, the frequency of the transmitted signal is taken to be sufficiently high, in the range of about 50 kHz to 1 MHz, so that the spatiotemporal resolution of the paths and timing will be adequate to distinguish the expected flow velocities, for example in the range of one to one hundred meters per second, and preferably so that the wavelength $\lambda$ in the pipe wall is not much larger than the thickness of the pipe wall. For example the wavelength may be selected to be less than the length of one skip in the conduit, allowing the shear wave signal to coherently travel along the wall. By way of example, in a steel pipe having a wall thickness of eight millimeters, a 500 kHz signal with a shear wavelength of six millimeters may be used, resulting in a skip length $L_p$ of almost three centimeters with $\theta_2=60°$. The signal is suitably launched with a transmitter and wedge arrangement having a contact line of about four centimeters; the receiver is of similar construction, and is placed on the opposite side, with a similar clamp-on wedge or mounting block.

A suitable construction for a transducer for the practice of the present invention, includes a PZT crystal with both sides electroded by metal plating and mounted to a clamping wedge or mounting block to launch its signal s into or receive a signal from, the conduit. The transducer may be a transducer modified from the type commonly used for nondestructive testing of materials (NDT), for example, by reducing its damping so as achieve high power output but still produce a relatively broad band and short pulse signal. The crystal is sized to provide primarily a single mode, and relatively short pulse, such as 3–7 cycle burst. Electrode connections and electromagnetic shielding may be of conventional type. The lightly damped construction is particularly appropriate for broadband short-pulse transit time operation and, as described above, these transducers enhance conversion of the signal to a vertically polarized signal and, at the receiving end, reject other polarizations and reduce the reception of crosstalk.

Figure 1A:
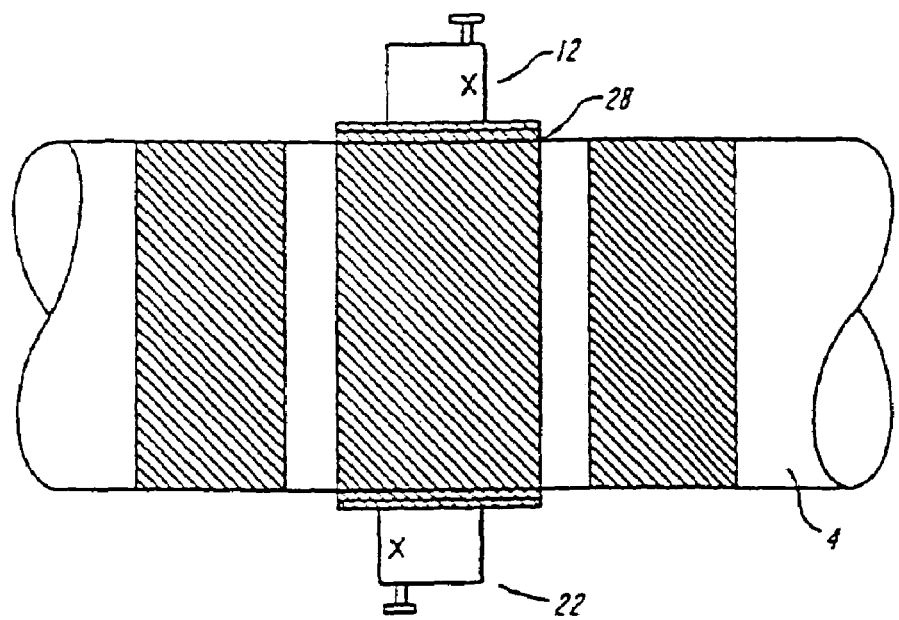
FIGS. 1A–1B illustrate damping assemblies in a preferred embodiment of the system of FIG. 1.
Figure 1B:
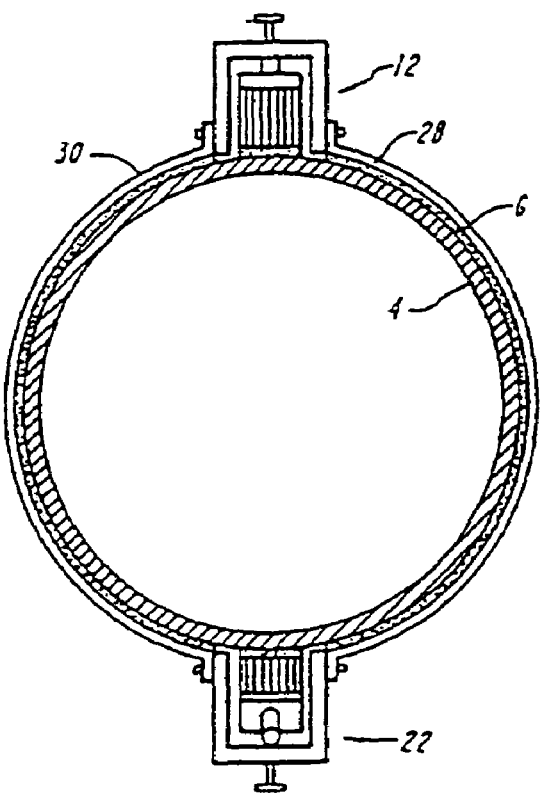

Applicant has further found that it is desirable to remove or greatly attenuate the crosstalk carried in the conduit to the receiving transducer assembly. Applicant has determined that the shear wave transducer coupling of the transmitter introduces crosstalk with a substantial component propagating around the pipe wall as Rayleigh wave energy. Its removal is accomplished by applying a material, such as an ultrasound coupling gel of suitable temperature rating or a high-temperature polymer such as silicone rubber, to the region of conduit wall between the two transducers. A gel may be used to couple this noise out into an additional damping structure, such as a fabric blanket, or a material that is itself damping may be applied. Other structures may be added with a clamping fixture to couple out or damp the wall-borne signal ahead of the receiving transducer, for example, by attaching an absorbing or damping material to intercept and divert the ultrasonic energy carried in the wall into the damping structure. It is also useful to apply damping material to the conduit along the length of conduit wall outside of the length on which the transducers reside, to reduce the amplitude of system noise entering the measurement segment. In that case, the coupling grease, rubber and/or other absorptive material or attenuation structure is applied outside the segment to reduce general system noise, as well as between transducers to remove crosstalk propagating as surface wave energy between transducers. FIGS. 1A and 1B illustrate a suitable construction for such damping. As shown in side and cross-sectional views, respectively, circumferential damping members 28, 30 extend between the two transducer assemblies 12, 22 and secure the coupling material G firmly against the pipe wall 4.

Figure 2:
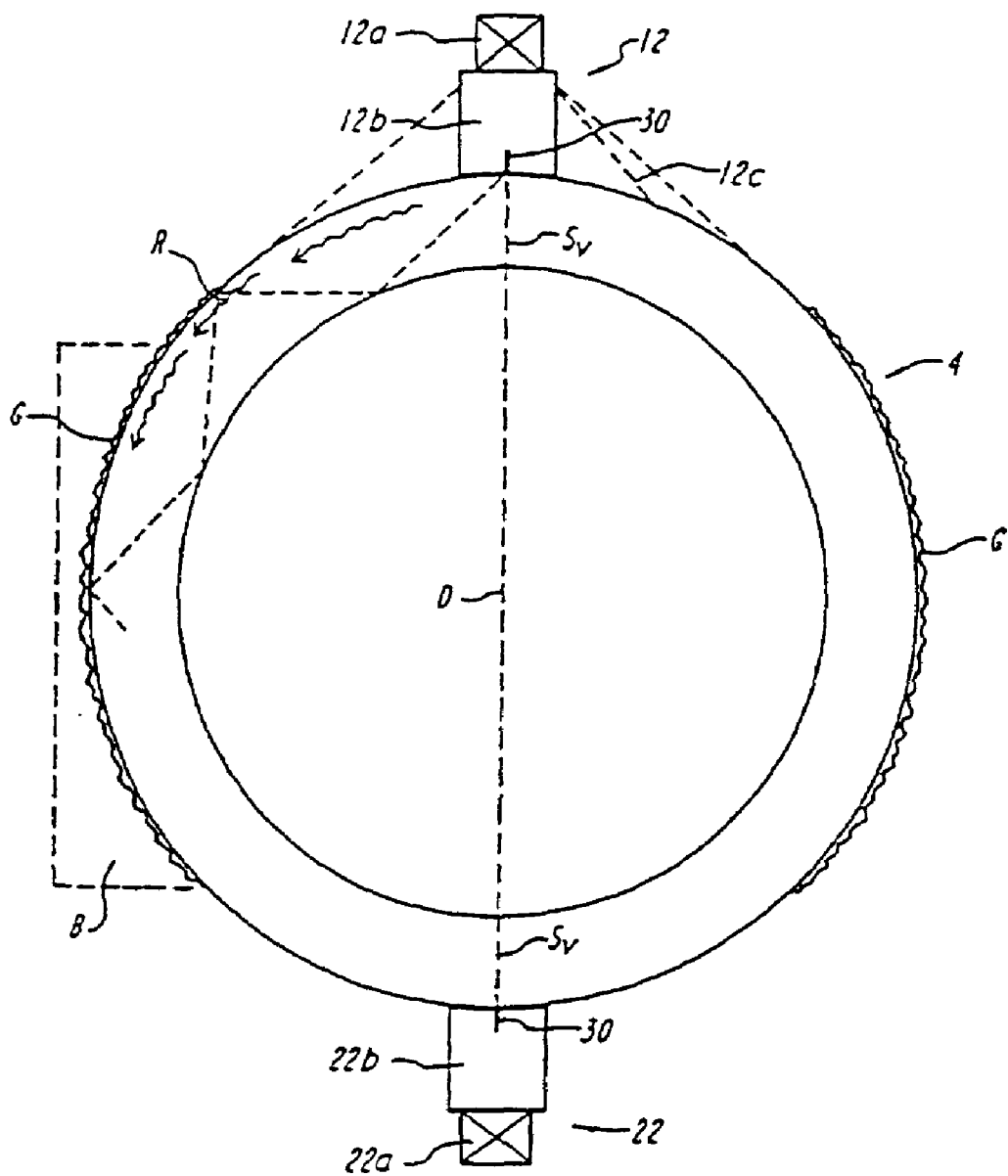
FIG. 2 shows a cross-section illustrating mounting geometry for the embodiment of FIG. 1.

FIG. 2 illustrates a cross-sectional view of a steam conduit 2 having transmitting and receiving transducer assemblies, 12, 22 mounted thereon in accordance with one aspect of the present invention. By way of example, the conduit may have a diameter of approximately thirty centimeters and a wall thickness of about one centimeter operative to contain steam at a pressure of about ten to fifteen atmospheres at a temperature of, for example, 200° Celsius. As shown, each transducer assembly includes an ultrasonic signal source 12a such as a piezoelectric crystal, piezotransducer array or other vibration generating source, and this is attached to a wedge 12b for coupling to the conduit 4. The wedge 12b is urged against the conduit by a steel band or other clamping mechanism shown schematically by 12c to cinch it down into firm contact with the conduit wall. A mounting block secured by such a band may also be used, in which case the block may further include various screws for tightening down and aligning the transducer. The installation is preferably effected with a high precision clamp fixture—for example having two contact points to fix the transducer assembly against sliding or misalignment. Proper orientation may be achieved in the field by first scribing a line along the surface of the conduit on the diameter, and also providing a similar central line or marking 30 scribed on each of the coupling wedges 12b, 22b. The wedges are placed in an exact orientation along the axis by aligning their centering marks with the diametral center line of the conduit, and are clamped in position. This positions both transducers in a common plane, enhancing the received signal. Preferably the wedge/pipe contact area is a thin line or region, and the two assemblies are aligned parallel to each other within about five degrees. Pipe seams are to be avoided in the mounting region. When thus accurately aligned along the axis with this arrangement, the vertically polarized shear wave coupled into the pipe follows a skipping path as shown in FIG. 1 which remains coherent for a distance of several skip lengths along the wall, energizing the wall to launch a narrow signal beam in a diametral plane across to the opposing transducer. The cylindrical curvature of the pipe aids in focusing and receiving this beam.

The wedge 12b, 22b can be relatively narrow and its primary beam stays centered in the required plane and couples well into the gas, while shear waves of horizontal polarization SH spread laterally in the conduit, and are coupled into the fluid with very low efficiency. These horizontally polarized shear waves produce a crosstalk signal in the conduit wall that appears to propagate like Rayleigh waves R to the opposing transducer. The wedges 12b, 22b and their respective transducing crystals when acting as receivers are relatively inefficient at picking up and converting such laterally directed energy, so that the signal received from the vertically polarized signal reflecting portion of the wall is relatively strong and is distinguishable above the noise. As further illustrated, the surface region of the conduit 4 between the two sets of transducers is preferably covered with a couplant or material G (FIGS. 1A and 1B) into which the crosstalk or Rayleigh wave energy R escapes, resulting in a high attenuation of this short circuit noise. An additional structure such as a clamping shell (FIGS. 1A and 1B) or block B may be placed over the material G to further absorb the energy coupled out of the pipe or to contain and stabilize the layer of couplant over time. The figure illustrates energy circulating in one direction around the pipe from transducer 12 toward transducer 22; however, it will be appreciated that the crosstalk is launched substantially uniformly in both directions around the circumference, and, moreover, that each transducer may be actuated to transmit and receive so that similar wave energy propagates from transducer assembly 22 toward transducer assembly 12.

Figure 2A:
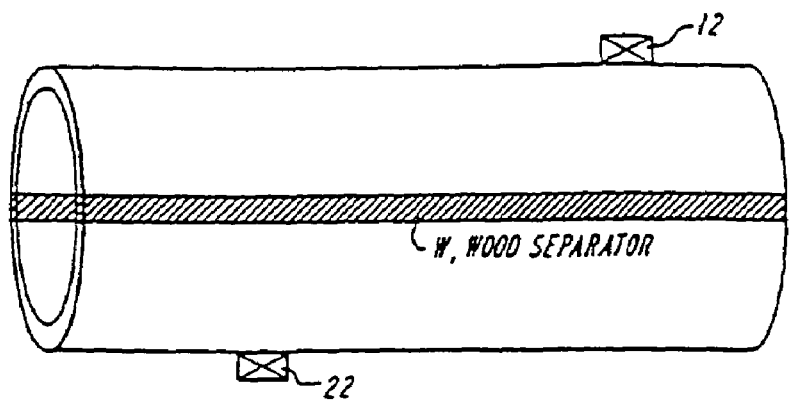
FIGS. 2A–2B illustrate an experimental signal evaluation set-up.
Figure 2B:
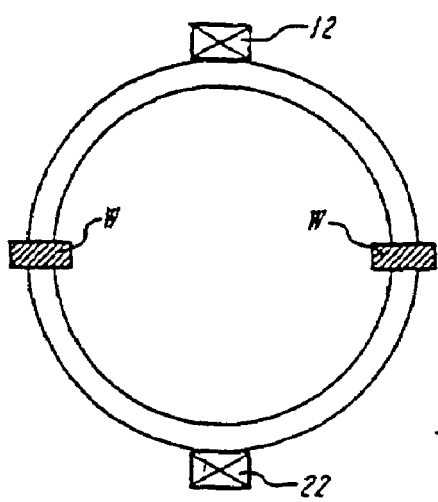

FIGS. 2A and 2B illustrate an experimental system set up to evaluate the amplitude of the fluid-borne portion of the signal and to simulate the transit path component through a steel wall and an air gap at atmospheric pressure. As shown in those Figures, a six inch diameter pipe was cut through along a central axial plane, and the two hemicylindroid shells were reconnected using wooden strips which sealed the interior while blocking short circuit noise from passing between the two transducers. The pipe was filled with air at atmospheric pressure. Transducer assemblies 12, 22 were centered and clamped to the conduit by clamp assemblies (not shown) to effect the vertically polarized shear wave transmission and reception geometry as illustrated in FIGS. 1 and 2 above. By acoustically disconnecting the two hemicylindrical surfaces, crosstalk was eliminated, permitting the evaluation of the received signals in a quiet environment. Measurements were taken at different transducer spacings.

Figure 3A:
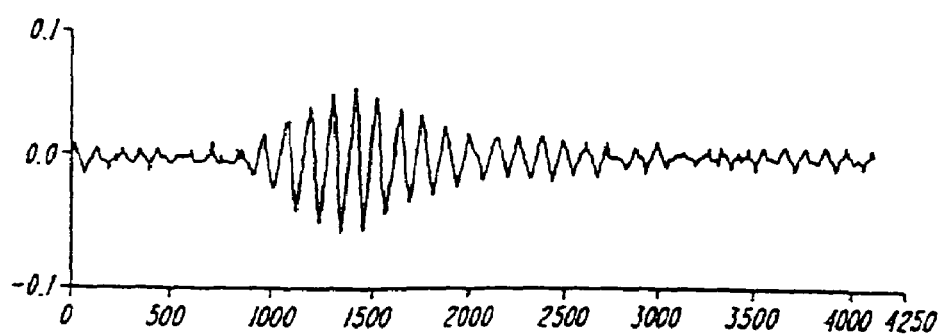
FIGS. 3A–3B illustrate received signals with different transducer spacings.
Figure 3B:
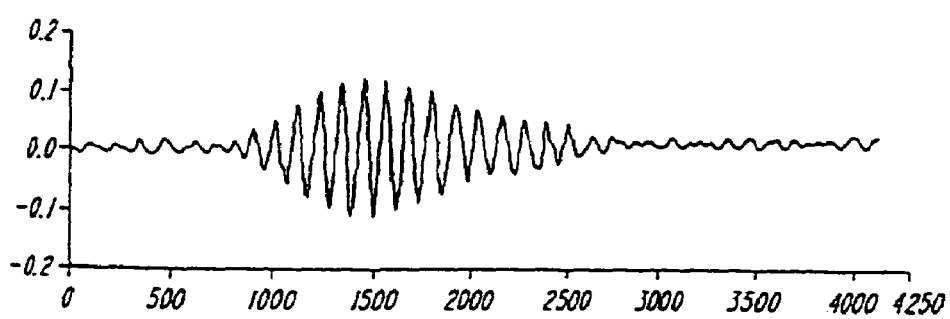

FIGS. 3A and 3B show the received signal for transducers separations of three inches (FIG. 3A) and six inches (FIG. 3B) along the axis of the six-inch diameter pipe. As shown, in each case the received signal was clearly defined. Moreover, the further-apart transducer separation surprisingly had an amplitude almost twice as great at the more closely-spaced arrangement. Thus, rather than diminishing with distance, a region of enhanced signal strength appeared at greater distance, vividly demonstrating the improvement obtained by energizing the conduit wall with a skipping signal.

To enhance the level of the signal to noise ratio, applicant explored the utility of composite transducer technology which is widely used in maritime sonar and in medical acoustic imaging. The fundamental advantages of composite transducer and various modeling and construction principles can be found in the theoretical work by W. A. Smith and B. A. Auld ("Modeling 1–3 Composite Piezoelectrics: Thickness-Mode Oscillator" IEEE Transactions on Ultrasonics, Ferroelectrics, and Frequency control. Vol. 38, No. 1 January 1991) and the references cited therein. By combining a strongly piezoelectric material and an inert polymer, many composite configurations are possible, allowing new properties to be achieved that could not be realized with either phase alone. Applicant utilized such a composite array transducer, illustrated schematically in FIG. 2C. This transducer construction produced an output with no side lobes, and together with the system architecture described in respect of FIGS. 1 and 2 above, produced a received signal of exceptional quality in a clamp-on air system. The high sensitivity of the transducer allowed clear reception of the transmitted tone burst signal through the air and pipe walls at ambient pressure, as shown in FIGS. 3A, 3B. The lack of the lateral mode further prevented generation of unwanted crosstalk noise emanating from the transmitter.

Figure 2C:
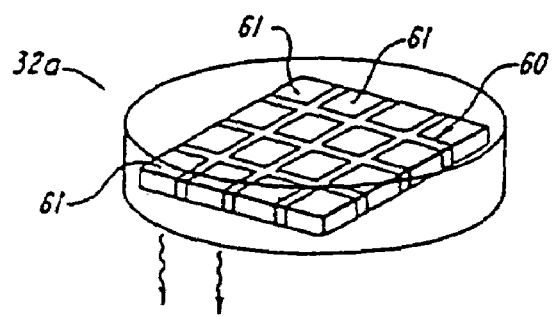
FIG. 2C illustrates architecture of a preferred ultrasonic transducer.

The array transducer 32a was constructed as shown in FIG. 2C. Its architecture was modified from constructions commonly employed for ultrasound and medical imaging technology. As shown in FIG. 2C, this transducer 32a utilized a transducer element 60 which was fabricated as an array of active cells 61 by sawing grooves in a larger element in a checkerboard pattern with channels or grooves cut substantially between the adjacent cells to isolate each one from the other. The channels cut between adjacent cells 61 were filled with potting material so that the element 60 formed a continuous block while de-coupling the individual cells from each other. The transducing element 60 was thus formed of a piezoelectric composite construction, giving it the strength to undergo powerful actuation without fracture, and the stiffness and acoustic impedance to operate at high frequency and couple into the wedge or pipe. This construction, like the VCSEL construction used to allow single mode lasers to be formed as an array of small elements, permitted the beam quality to be defined by the size of the small cells 61, while still energizing a large surface area with substantial signal power. The element 60 was fitted in a mounting to form a transducer with a disk-shaped emitter face that was actuated with substantially uniform power across its area by the multitude of individual cells 61. Each cell was dimensioned so that its mechanical resonance was tuned to the 500 kHz driving frequency. In a preferred construction, the cell array is configured to not support other nearby mechanical modes so that a broad single band response of defined spectral characteristics and compatible with coherent driving signals is applied to the transducer output face. In the frequency domain, the output forms a single broad band without a dip, so the transducer output was free of side lobes. The resulting ultrasonic wave is coupled into the test conduit (FIGS. 2A, 2B).

Several other considerations should be kept in mind when implementing the steam or gas measurement system of this invention. In addition to the above transducer geometry, it is preferable when mounting the transducer assemblies in an established steam plant to locate them in a straight conduit some distance away from the nearest conduit joints or reflective structures, such as flanges or other wall irregularities. This prevents the occurrence of additional bursts or echoes of crosstalk beyond those associated with the direct solid paths between the transducers, and it also avoids encountering excessive conduit noise that is associated with flow irregularities at such junctions. Thus, for example, it is preferable to mount the transducer assembly at least a meter away from any flange or other coupling. Furthermore, in order to measure an unperturbed flow, it is desirable to mount the transducer assemblies away from any existing flow obstructions such as shedding bodies or special by-pass arrangements that may have been installed for other metering applications in the past, and away from, or at a defined distance from, known flow disturbances such as elbows. As noted above, one may also apply damping material, or coupling material in a damping structure, to regions of the conduit located outside of the segment between transducers so as to attenuate system background noise travelling in the conduit at large.

The invention as set forth above was also applied to the highly noisy conditions of an operating steam plant and the received signals were processed to determine flow measurements of steam at a pressure of about 195 psig and temperature of 407° F. Composite transducers as described above were attached top a standard intervalometer/driver flow meter, a Panametrics, model GS868 meter with suitable software for clamp-on applications, and measurements were made over a period of forty minutes as the mass flow rate varied between about 1000 pounds/hour and 6000 pounds/hour in a four inch pipe. The measurements were compared against measurements simultaneously taken by a previously installed vortex metering system.

Figure 4:
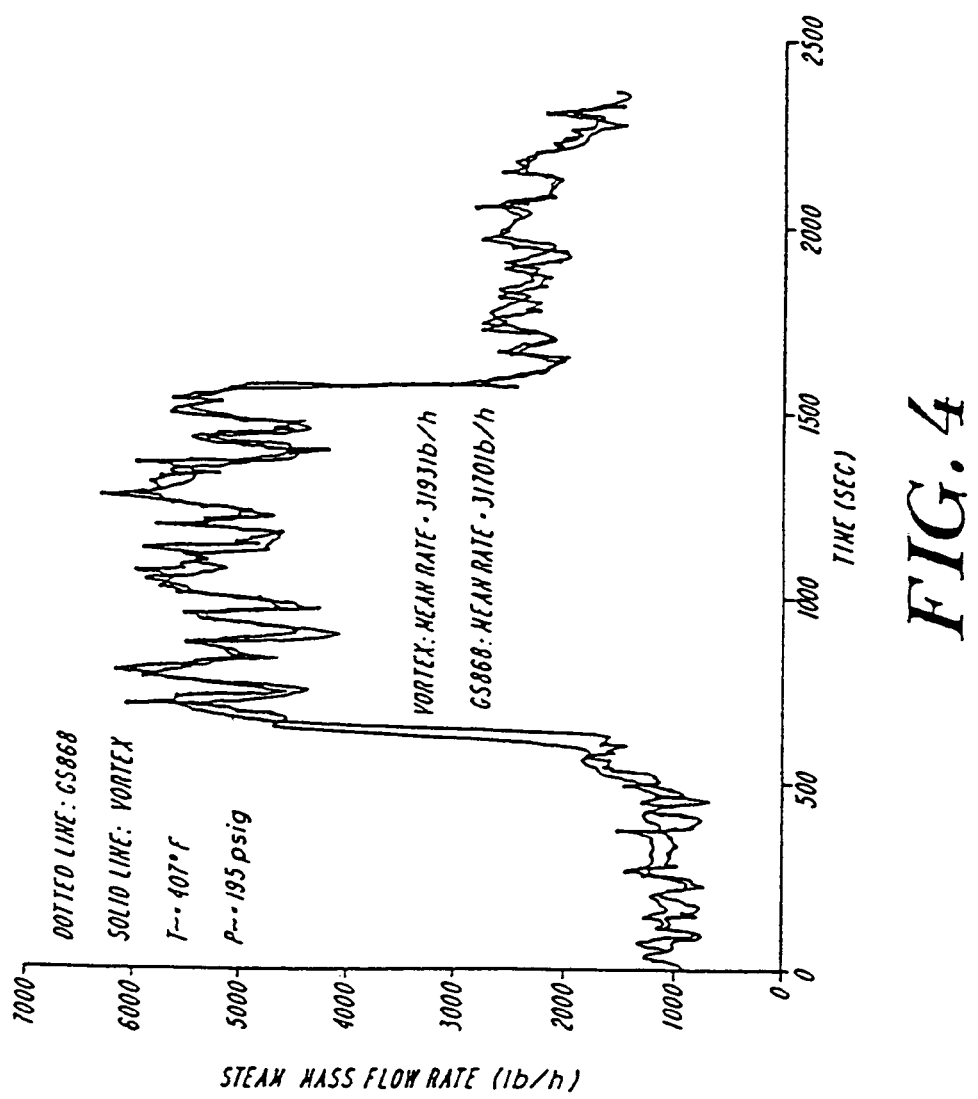
FIG. 4 illustrates clamp-on steam flow measurement results.

FIG. 4 shows the results of this test. As shown, the clamp-on measurements of the present invention (dotted graph) agreed with the vortex measurements (solid graph) obtained from the more costly installed measurement system.

Figure 5:
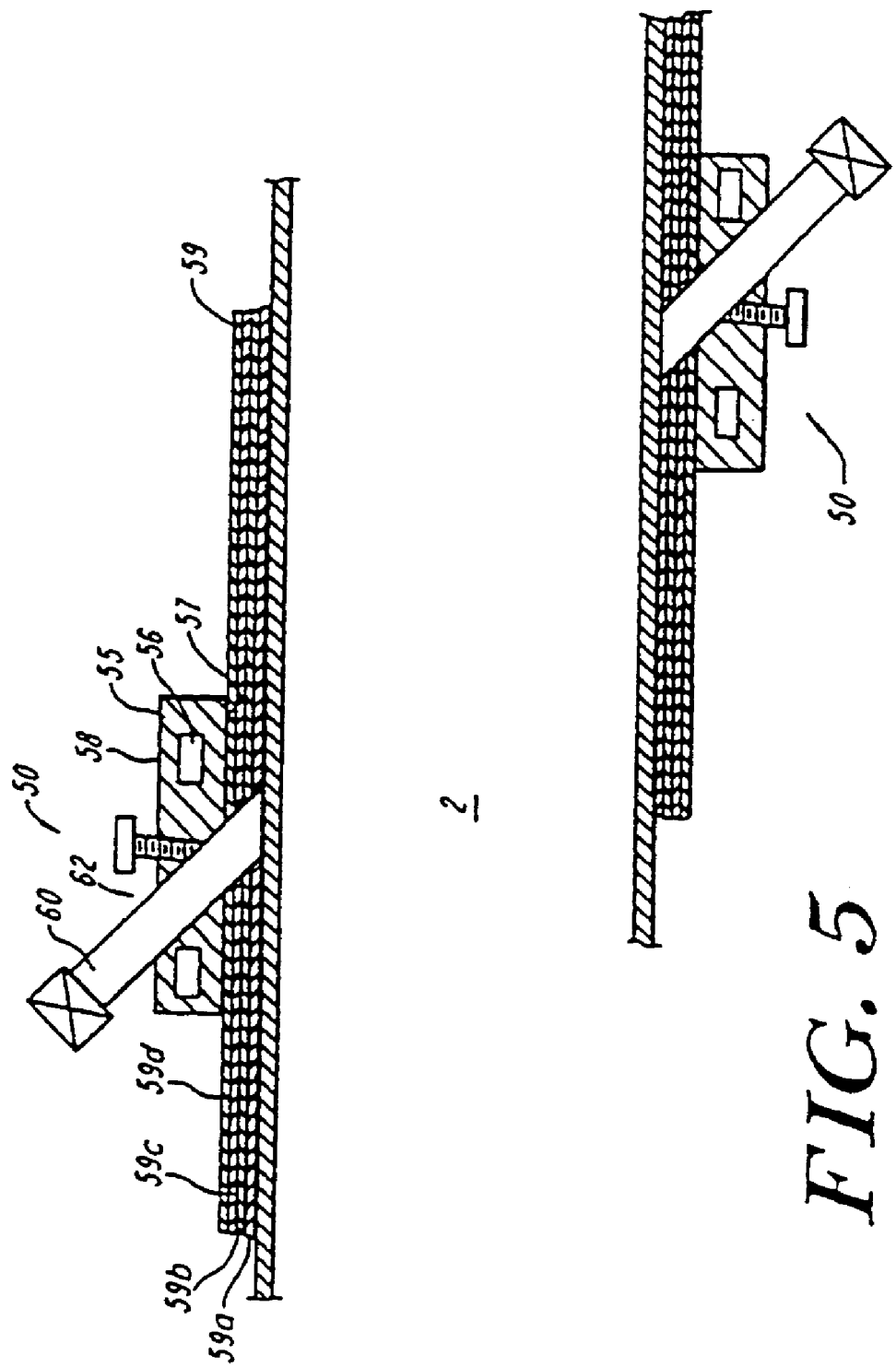
FIG. 5 illustrates transducer mounting in accordance with another aspect of the invention.

In accordance with another aspect of the invention, mounting block employed to clamp the transducer assembly against the conduit may itself be thermally insulated or offset from the conduit, and may thus provide a sink to actively cool the transducer or wedge. A preferred embodiment of this aspect of the invention is shown in FIG. 5, which shows a schematic view, in section, of a conduit 2 and two thermally insulated clamp-on transducer/mounting assemblies 50. As shown in this figure, the clamp-on assembly 50 includes a clamp-on mounting block 55 that secures the transducer or wedge assembly 60 in contact with the conduit. The block 55 preferably has a surface 57, which is preferably curved to a contour to match the conduit 2, and is mounted on the conduit over a layer of damping material 59 as described above. For this application, the damping material 59 may include a layer of coupling grease or gel 59a, and a cover layer of fiberglass fabric or the like 59b which stabilizes the gel or grease for long term operation at high temperature. Through channels 56 may be provided through the block, or other suitable grooves or guides may be provided on its upper surface, to received clamping bands passed around the conduit, or the block may be otherwise secured to the conduit by chains, straps or U-bolts so it is rigidly affixed and maintains its position.

As shown, the shear wave transducer assembly 60 fits through an aligned groove or bore 62 in the block 55. This precisely orients the transducer and is shaped so the block thermally contacts the transducer assembly. While the block 55 is separated from the conduit by the damping layer 59, a window is provided in that layer through which the transducer assembly contacts the pipe wall directly. The fabric and gel/grease have relatively low thermal conductivity, and applicant has found that for a steam conduit at about 200° C., the block itself remains about 50° C. cooler for each gel/fabric layer 59a, 59b. Thus, the block cools the transducer assembly, providing a much greater heat dissipation area than a common coupling rod, without the acoustic degradation that a large-dimensional rod would introduce. When a polymer wedge is used, the block 55 provides greatly enhanced cooling and further serves to provide a lower operating temperature fo both the transducer element and the polymer wedge. Additional layers or pads of damping material or fabric 59d may be provided, with further gel or grease 59c between successive layers to enhance transducer cooling on hot conduits, or reduce transducer cooling on cold or cryo conduits. In these constructions where the damping material is used to thermally insulate the mounting platform, care should be exercised to assure that alignment between the two transducers is not impaired.

The invention has been described above with respect to the measurement of a fluid of low density or acoustic impedance. The various embodiments involve novel arrangements wherein the transmitting and receiving transducers are aligned and configured to provide and capture a signal of enhanced energy level and SNR to resolve flow velocity with dependable and effective resolution despite the conduit noise and low signal which generally afflict such fluid systems. The invention thus enables one to measure several fluids which have been previously in accessible to effective clamp-on measurement, including, for example, low molecular weight hydrocarbons, low pressure steam, flare gas, or other gases. Furthermore, the array architecture of the preferred composite transducer construction allows one to fabricate arrays which are energized by electrodes to directly produce the desired shear wave signals, and these may be attached or even cemented directly to the pipe without requiring a shear wave wedge when the system temperature is compatible with the transducer material, e.g., well below about 450° F. for piezoelectric ceramic composites. Also, when operating in a receiving mode, advantage may be made of the individual cell outputs to perform more complex filtering to remove noise and crosstalk in the received signal. Advantageously, the mounting to thermally isolate a transducer holding block or plate adds further advantages for high temperature systems where noise has hereto for prevented effective clamp-on measurements.

The invention being thus described, variations and modifications will occur to those skilled in the art, and all such variations and modifications are considered to be within the scope of the invention, as defined by the claims appended hereto and equivalents thereof.

What is claimed is:

1. A flow measurement system comprising:
   at least first and second ultrasonic transducers coupled to an existing conduit;
   a non-metallic pliable damping material about the exterior surface of the existing conduit between the first and second ultrasonic transducers to prevent crosstalk;
   a non-metallic pliable damping material about the exterior surface of the existing conduit upstream of the first ultrasonic transducer to attenuate system background noise travelling in the conduit at large; and
   a non-metallic pliable damping material about the exterior surface of the existing conduit downstream of the second ultrasonic transducer to attenuate system background noise travelling in the conduit at large.

2. The system of claim 1 in which the damping material is a polymer material.

3. The system of claim 1 in which the damping material is rubber.

4. The system of claim 1 in which the damping material is grease.

5. The system of claim 1 in which the damping material is a gel.

6. The system of claim 1 in which the damping material circumferentially surrounds the conduit.

7. The system of claim 1 in which the damping material is disposed directly on the conduit.

8. The system of claim 1 in which the transducers are clamped directly on the conduit.

9. A flow measurement system comprising:
at least first and second ultrasonic transducers coupled to an existing conduit;
non-metallic pliable damping material about the exterior surface of the existing conduit upstream of the first ultrasonic transducer to attenuate system background noise travelling in the conduit at large; and
a non-metallic pliable damping material about the exterior surface of the existing conduit downstream of the second ultrasonic transducer to attenuate system background noise travelling in the conduit at large.

10. The system of claim 9 in which the damping material is a polymer material.

11. The system of claim 9 in which the damping material is rubber.

12. The system of claim 9 in which the damping material is grease.

13. The system of claim 9 in which the damping material is a gel.

14. The system of claim 9 in which the damping material circumferentially surrounds the conduit.

15. The system of claim 9 in which the damping material is disposed directly on the conduit.

16. The system of claim 9 in which the transducers are clamped directly on the conduit.

17. A flow measurement system comprising:
at least first and second ultrasonic transducers coupled to an existing conduit;
a non-metallic pliable damping material about the exterior surface of the existing conduit between the first and second ultrasonic transducers to prevent crosstalk; and
a non-metallic pliable damping material about the exterior surface of the existing conduit upstream of the first ultrasonic transducer to attenuate system background noise travelling in the conduit at large.

18. The system of claim 17 in which the damping material is a polymer material.

19. The system of claim 17 in which the damping material is rubber.

20. The system of claim 17 in which the damping material is grease.

21. The system of claim 17 in which the damping material is a gel.

22. The system of claim 17 in which the damping material circumferentially surrounds the conduit.

23. The system of claim 17 in which the damping material is disposed directly on the conduit.

24. The system of claim 17 in which the transducers are clamped directly on the conduit.

25. A flow measurement system comprising:
at least first and second ultrasonic transducers coupled to a conduit;
damping material about the exterior surface of the conduit between the first and second transducers to prevent crosstalk;
damping material about the exterior surface of the conduit upstream of the first ultrasonic transducer to attenuate system background noise travelling in the conduit at large;
damping material about the exterior surface of the conduit downstream of the second ultrasonic transducer to attenuate system background noise travelling in the conduit at large; and
a cover layer disposed on the damping material for stabilizing the damping material.

26. The system of claim 25 in which the damping material is a polymer material.

27. The system of claim 25 in which the damping material is rubber.

28. The system of claim 25 in which the damping material is grease.

29. The system of claim 25 in which the damping material is a gel.

30. The system of claim 25 in which the damping material circumferentially surrounds the conduit.

31. The system of claim 25 in which the damping material is disposed directly on the conduit.

32. The system of claim 25 in which the transducers are clamped directly on the conduit.

33. A flow measurement system comprising:
at least first and second ultrasonic transducers coupled to an existing conduit;
a non-metallic pliable damping material about the exterior surface of the existing conduit between the first and second ultrasonic transducers to prevent crosstalk; and
a non-metallic pliable damping material about the exterior surface of the existing conduit downstream of the second ultrasonic transducer to attenuate system background noise travelling in the conduit at large.

34. The system of claim 33 in which the damping material is a polymer material.

35. The system of claim 33 in which the damping material is rubber.

36. The system of claim 33 in which the damping material is grease.

37. The system of claim 33 in which the damping material is a gel.

38. The system of claim 33 in which the damping material circumferentially surrounds the conduit.

39. The system of claim 33 in which the damping material is disposed directly on the conduit.

40. The system of claim 33 in which the transducers are clamped on the conduit.

41. The flow measurement system of claim 25 in which the cover layer is fiberglass fabric.

* * * * *